Sept. 21, 1954
J. H. BEYER
2,689,407
MECHANISM FOR MEASURING THE WALL
THICKNESS OF TUBULAR BODIES
Filed May 7, 1951
3 Sheets-Sheet 1
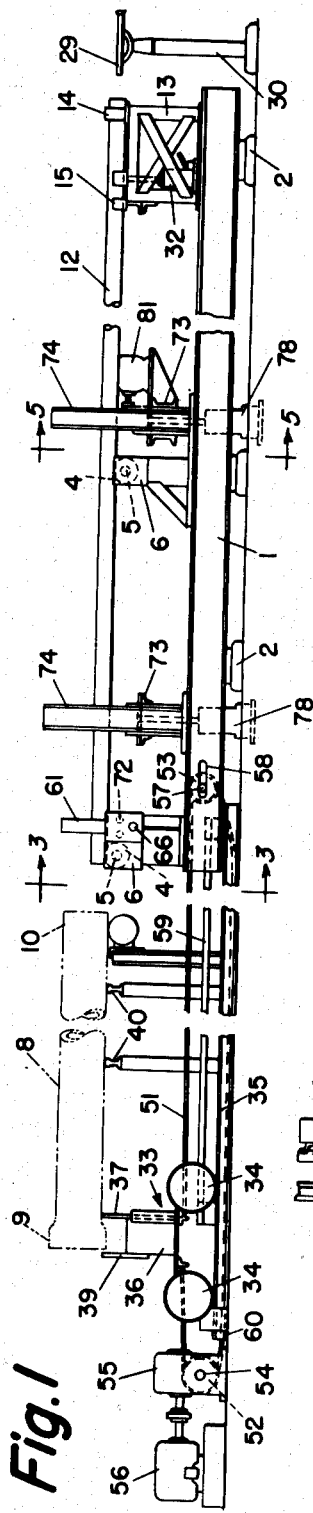
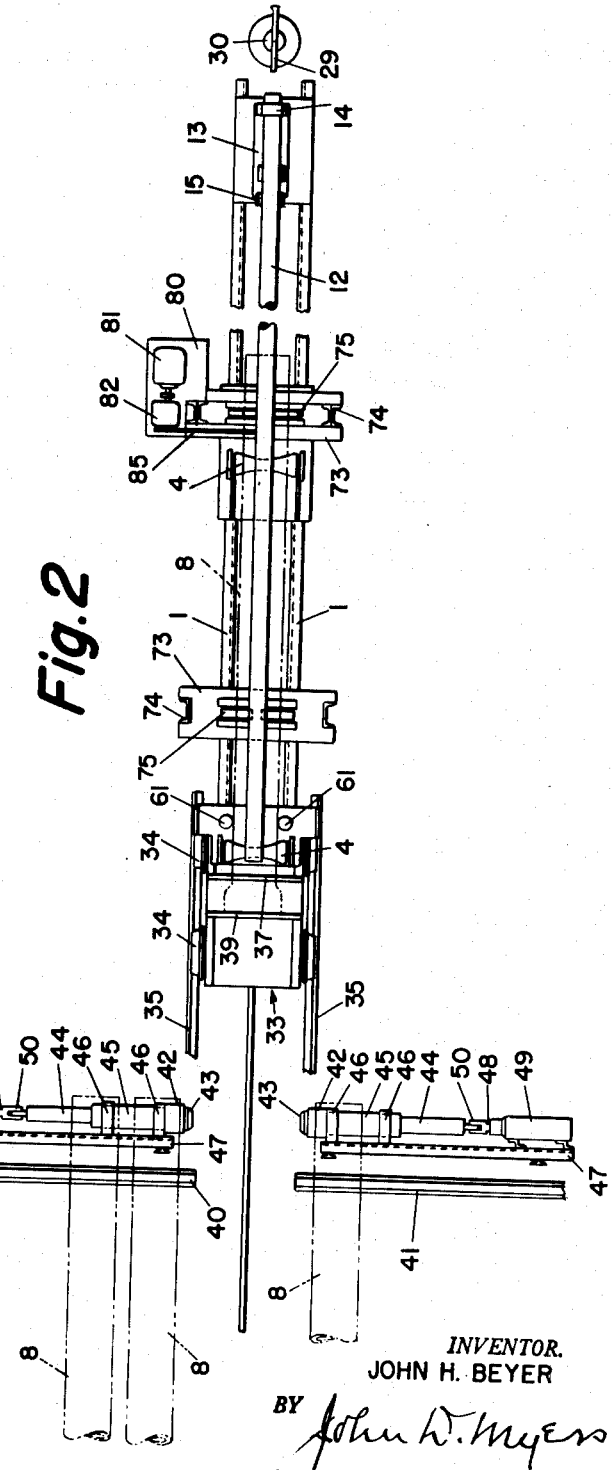
INVENTOR.
JOHN H. BEYER
BY John D. Myers
ATTORNEY Sept. 21, 1954     J. H. BEYER     2,689,407
MECHANISM FOR MEASURING THE WALL
THICKNESS OF TUBULAR BODIES Filed May 7, 1951     3 Sheets-Sheet 2

INVENTOR.
JOHN H. BEYER
BY John D. Meyers
ATTORNEY

Sept. 21, 1954   J. H. BEYER   2,689,407
MECHANISM FOR MEASURING THE WALL
THICKNESS OF TUBULAR BODIES
Filed May 7, 1951   3 Sheets-Sheet 3

INVENTOR.
JOHN H. BEYER
BY John D. Myers
ATTORNEY

Patented Sept. 21, 1954

2,689,407

UNITED STATES PATENT OFFICE 2,689,407

MECHANISM FOR MEASURING THE WALL THICKNESS OF TUBULAR BODIES

John Henry Beyer, Beverly, N. J., assignor to United States Pipe and Foundry Company, a corporation of New Jersey Application May 7, 1951, Serial No. 224,940

10 Claims. (Cl. 33—147)

The present invention relates to mechanisms for measuring the wall thickness of tubular bodies and has for its primary object the provision of a device for conducting such measurements by non-destructive methods, contrary to the practice commonly employed heretofore, whereby the marketability of the measured article is not adversely affected.

Another object is to provide apparatus for the above purpose which will permit quick and accurate determinations of wall thickness of a hollow body throughout its entire length and along any desired longitudinal element thereof.

Other and ancillary objects and advantages of the invention will become apparent from the specification in which reference is made to the accompanying drawings illustrating a preferred embodiment of the invention.

In the drawings,

Fig. 1 is a side elevation of the entire mechanism;

Fig. 2 is a plan view thereof with the parts arranged to place the beam of the apparatus within the tubular body being measured, the carriage moving apparatus being omitted;

In the following description the apparatus will be described as applied to the measurement of the wall thickness of a bell-ended pipe, but it will be readily understood that the invention may be used with equal facility for determining the wall thickness of any generally cylindrical hollow body, as well as hollow bodies of prismatic and conical configuration.

Figure 3:
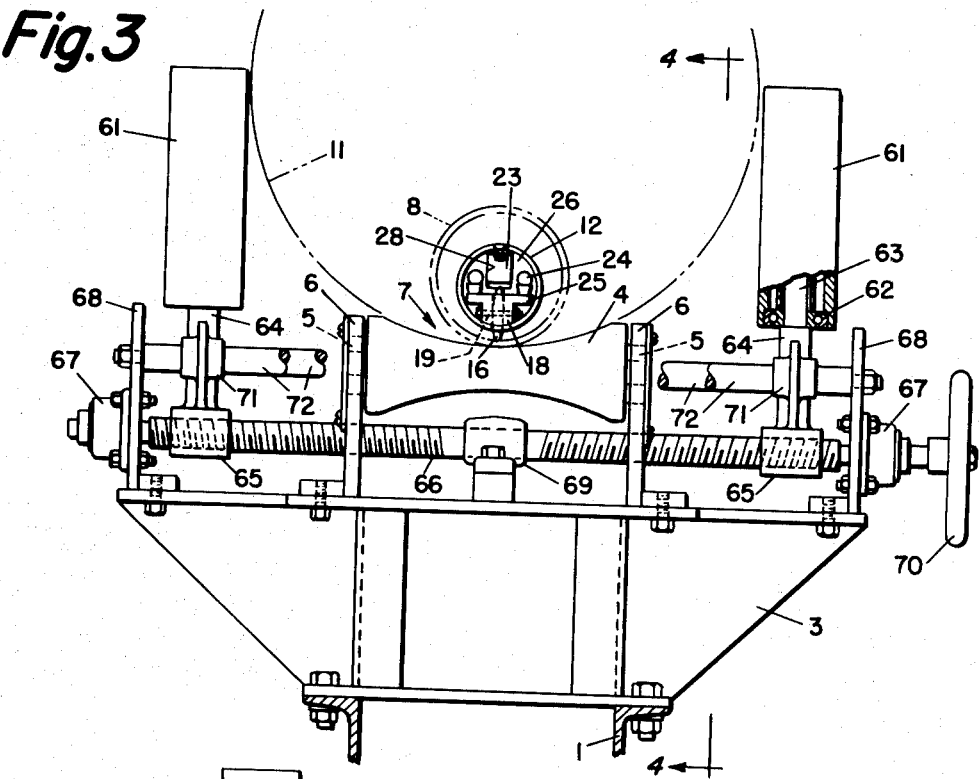
Fig. 3 is in section taken along line 3—3 of Fig. 1.
Figure 4:
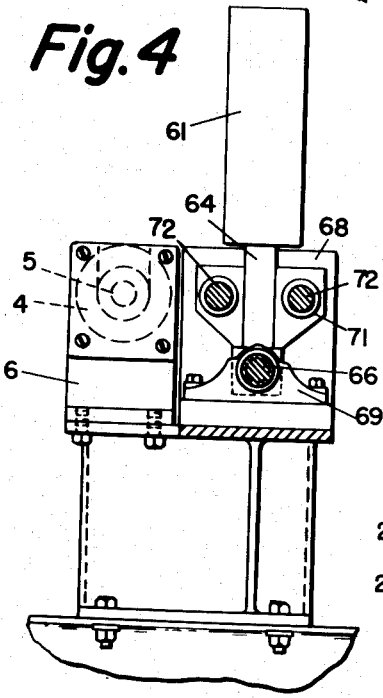
Fig. 4 is a vertical section taken along line 4—4 of Fig. 3, with the beam omitted.
Figure 6:
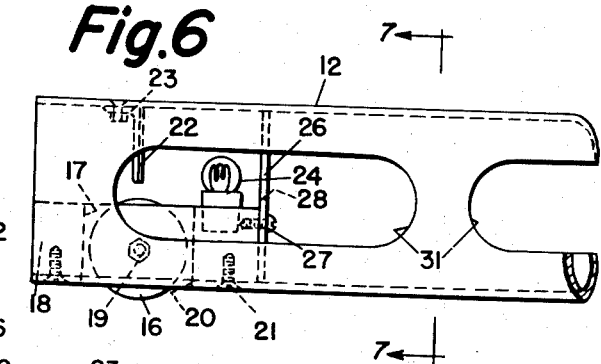
Fig. 6 is a side elevation of the free end of the beam.
Figure 7:
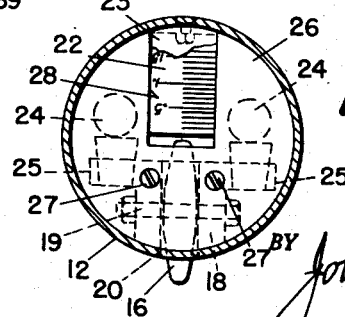
Fig. 7 is a cross-sectional view taken along line 7—7 of Fig. 6.

Referring now to the drawings, and particularly to Figs. 1 and 3 thereof, the embodiment there illustrated comprises a main structural base member 1 rigidly supported on piers or other foundations 2 and providing support for frame members 3 disposed transversely of the apparatus. A plurality of horizontal rollers 4 are journaled in bearings 5 provided in side frames 6 on the frames 3, the rollers defining a bed, designated generally as 7, for supporting a pipe 8 in a substantially horizontal position for relative motion of the pipe thereon along its longitudinal axis, i. e., perpendicular to the axes of the rollers. The pipe 8, the wall thickness of which is to be measured, may have a bell 9 at one end and a spigot 10 at the other end. Preferably, the rollers 4 are of hour-glass shape, i. e., the contact surfaces thereof are concave, and the radius defining the concavity is at least as great as the outside radius of the particular pipe 8 to be measured. The circular broken line 11 in Fig. 3 illustrates the largest diameter pipe that may be accommodated by the concave roller 4 shown in that figure.

A beam member 12, here illustrated as a tube, is supported in cantilever fashion adjacent one end of the bed 7 upon a support frame 13 by means of a steel strap 14 and a saddle 15 so aligned as to position the free end of the beam over the bed 7, as shown. With the beam in this position it will be clear by inspection that it is adapted to enter the bore of a pipe 8 on the bed 7 when the pipe is moved longitudinally relatively to the beam toward the fixed end thereof. A follower, preferably in the form of a roller 16, is provided at the free end of the beam for contacting the inside surface of the pipe to be measured.

The follower roller 16 is mounted in a vertical slot 17, provided in a block member 18, for rotation about a horizontal shaft 19, the roller 16 being of such diameter that it protrudes from the bottom of the beam 12 through a slot 20 therein. The roller mounting block 18 is secured to the free end of the beam by any convenient means, as by screws 21. Adjacent the follower 16 is a vertically disposed linear scale 22 which is preferably inscribed on an angle member 23 depending from the upper portion of the interior of the beam, the indicia of the scale corresponding to any desired linear units. Electric lights 24 are positioned adjacent the scale 22 for its illumination and are conveniently supported by brackets 25 carried by the block 18.

A shield 26 of a diameter corresponding substantially to the inside diameter of the beam 12 is fixed to the block 18, as by screws 27, for the purpose of shielding an observer from the glare of the lights, the shield 26 preferably being polished on the side adjacent the lights in order to aid in illuminating the scale 22. An aperture 28 is provided in the shield in alignment with the scale to permit reading of the latter by means of an optical instrument, e. g., a telescope 29 supported by a standard 30 adjacent the fixed end of the beam 12 and in alignment with the bore thereof. The beam 12 is preferably provided with apertures 31 to eliminate heat waves within the beam which would tend to distort the scale 22 during a reading thereof. A jack member 32 is provided adjacent the fixed end of the beam for lifting the free end thereof to facilitate insertion of the beam into the bore of the pipe to be measured.

Longitudinal movement of a pipe 8 with respect to the bed 7 during measurement of the wall thickness of the former is effected by a carriage 33 provided with wheels 34 and movable thereon toward and away from the bed 7 on rails 35 arranged in alignment with the bed at the end thereof remote from the fixed end of the beam 12. The frame 36 of the carriage supports a transversely disposed pipe supporting plate 37 having an arcuate depression 38 therein to accommodate a pipe at a point on its cylindrical wall adjacent the bell 9 thereof. Also supported on the carriage frame 36, but somewhat more removed from the bed 7 than plate 37, is a transverse push plate 39, the space between the plates being sufficient to accommodate the bell 9. Thus, when the carriage 33 moves toward the bed 7 (Fig. 1), the plate 39 pushes the pipe along the bed, and when the carriage is moved away from the bed the plate 37 contacts the bell 9 and pulls the pipe along the bed in the opposite direction.

A set of skids 40 of substantially the same height as carriage 33 is provided on one side of the rails 35 for holding a plurality of pipes 8 to be measured, and a second set of similar skids 41 is positioned on the opposite side of the rails to receive the pipes after measurement. By this arrangement, pipes 8 may be expeditiously rolled onto and off the carriage 33 by hand.

When the bell end of a pipe 8 is supported on the carriage preparatory to measurement, as described above, the spigot end 10 of the pipe rests upon a pair of coaxial pipe support rollers 42. The rollers 42 are beveled at their adjacent ends, as at 43, and are rotatably mounted at the free ends of shafts 44 slidable in cylindrical guides 45 which are fixed by means of brackets 46 to frames 47 on opposite sides of the rails 35 and positioned transversely thereof. The shafts 44 are movable simultaneously in their guides 45 toward and away from each other preferably by means of plungers 48 operating in hydraulic cylinders 49. The plungers 48 are coupled to the shafts 44, as shown at 50, whereby the rollers 42 may be moved between positions in which their beveled ends are substantially in contact for supporting the free end of the pipe 8 to be measured, and positions in which they are separated sufficiently to permit the carriage 33 to pass therebetween. Thus, the carriage may be brought into close proximity to the bed 7 and move the entire cylindrical length of the pipe onto the bed during the course of measurement of the pipe, as will be described more fully hereinafter.

Any convenient means may be employed to move the carriage on the rails 35, the means illustrated comprising a belt chain 51 running over sprockets 52, 53 and connected to the carriage from opposite directions, as shown. The sprocket 52 is fixed to the output shaft 54 of a gear reduction unit 55 coupled to a reversible electric motor 56, and the sprocket 53 is pivoted freely on a shaft 57 adjustable in a slot 58 in the base member 1, whereby the tension of the belt chain may be adjusted. Troughs 59 and 60 are preferably provided for the upper and lower courses respectively of the belt chain for obvious reasons.

The arcuate depression 38 in the support plate 37 cooperates with the notch formed by the bevels 43 when the rollers 42 are contiguous to align a pipe 8 with the beam 12, during the early part of the travel of the carriage 33 toward the bed 7. However, the notch provided by the bevels 43 does not continue to assist in maintaining such alignment since, as explained above, the rollers 42 are retracted from one another to permit the carriage to pass between them as it approaches the bed 7. Therefore, additional means for maintaining proper alignment of the pipe 8 with the beam 12 are provided at the entrance to the bed in the form of a pair of vertical rollers 61 mounted on bearings 62 carried by shafts 63. The shafts 63 are integral respectively with bracket members 64 disposed on opposite sides of the center-line of the bed 7. The brackets 64 are provided with internally threaded collars 65 which engage a lead screw 66 journaled at its ends in bearings 67 in vertical frame members 68 on the frame 3. The lead screw 66 is supported at an unthreaded portion of its center by a pillow block 69 also carried by the frame 3.

As shown in Fig. 3, the lead screw 66 is provided with right-hand threads on one side of the pillow block and left-hand threads on the other side thereof, whereby the rollers 61 may be moved simultaneously and in equal amounts toward or away from the center-line of the bed by rotating the screw 66 by means of a hand wheel 70 fixed to one end of the screw shaft. The rollers 61 are maintained substantially vertical by means of sleeves 71 formed in the brackets 64 for sliding engagement with guide rods 72 supported at their ends in the frames 68.

Figure 5:
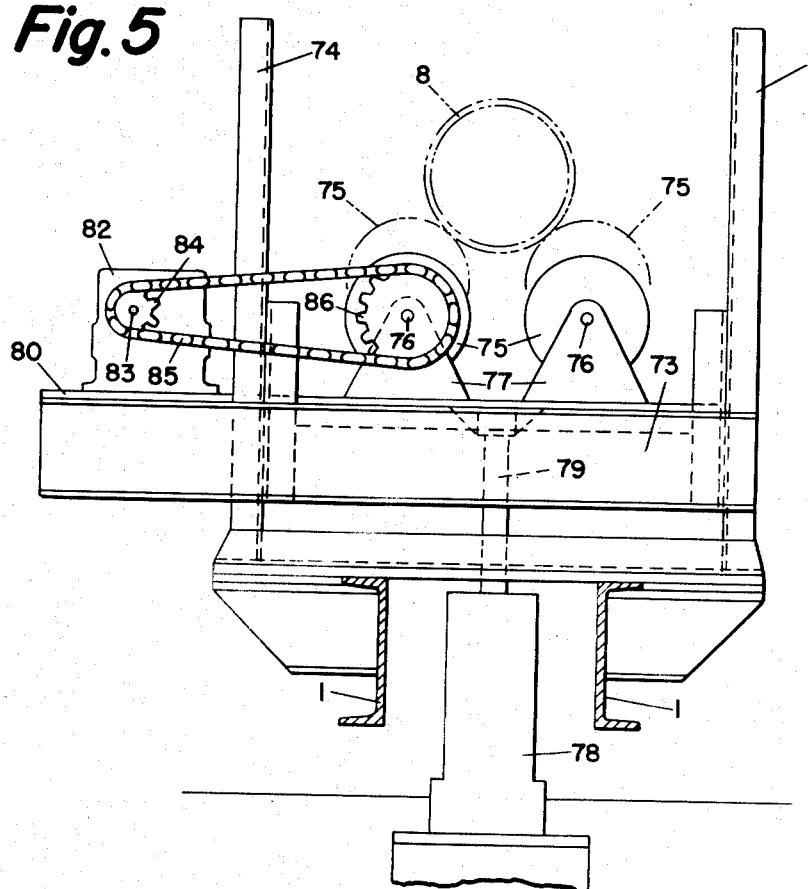
Fig. 5 is a vertical section taken along the line 5—5 of Fig. 1, with the auxiliary rollers and the tubular body supported thereon shown in phantom view in their elevated positions.
Figure 8:
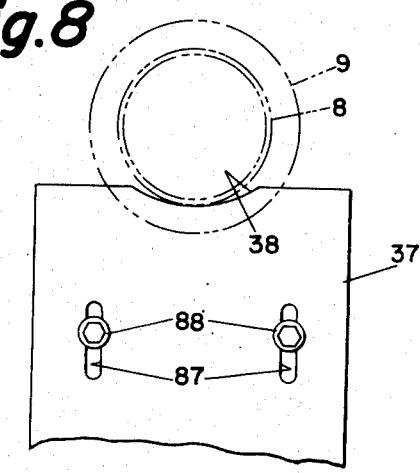
Fig. 8 is a front elevation of the support plate, showing in phantom view a bell-ended pipe supported thereby.

Between the fixed support 13 for the beam 12 and the remote end of the bed 7 are frame members 73 extending transversely across the bed and having U-shaped recesses at their ends for sliding engagement with vertical guides 74 disposed on opposite sides of the bed. On each of the frames 73 (Fig. 5) is a pair of rollers 75 keyed to shafts 76 journaled in bearing blocks 77 supported by the frame 73. The axes of the rollers 75 are disposed perpendicular to the axes of the concave rollers 4 and spaced on either side of the center-line of the bed. The rollers 75 are adapted to function as auxiliaries for handling a pipe to be measured, as will be explained in more detail hereinafter, and are normally below the horizontal plane of the bed 7 but are movable vertically a limited distance through the agency of a jack 78, which may be fluid operated if desired. The extensible portion 79 of the jack is attached to the frame 73, as shown in Fig. 5.

One of the frames 73 also carries a base plate 80, supporting an electric motor 81 and its gear reduction unit 82, the shaft 83 of the latter carrying a sprocket 84. A belt chain 85 is threaded around the sprocket 84 and a sprocket 86 fast on one of the shafts 76, whereby the corresponding roller 75 may be rotated about its axis. Thus, a pipe resting initially on the bed 7 may be lifted by the rollers 75 out of contact with the concave rollers 4 and, additionally, rotated about its longitudinal axis.

It is desirable that a pipe which is being moved on the bed of the measuring apparatus be supported on the concave roller 4 directly under the follower roller 16 and at only one other point, in order to eliminate errors in measurement which might otherwise be introduced by any bowing of the pipe being measured. Accordingly, the pipe supporting plate 37 is maintained slightly below the level of the bed defined by the concave rollers 4. By this arrangement a pipe initially supported near its ends by the plate 37 and the roller 4 under the free end of the beam will, after the center of gravity of the pipe has passed that roller, be supported only by both rollers 4, since the bell end of the pipe will then be raised from supporting contact with plate 37. Vertical slots 87 in the plate 37, through which bolts 88 secure the plate to the carriage frame 36, permit minor vertical adjustments of the plate.

Before commencing operation of the present apparatus the follower roller 16 at the free end of the beam 12 is allowed to rest on the concave roller 4 beneath it, and with the beam in this position the telescope 29 is adjusted so that its crosshairs are aligned with the zero index on the scale 22. Also, the pipe support rollers 42 are moved to their contiguous positions to provide a support for the spiogt end 10 of the pipe to be measured.

A pipe 8 is now manually moved from the skids 40 to the carriage 33 and rollers 42, the bell 9 of the pipe reposing between the plates 37 and 39 and the spigot lying on the rollers 42. The notch formed by the beveled ends of the rollers 42 cooperates with the depression 38 in plate 37 to align the pipe properly with the beam 12. The carriage moving apparatus is now opertaed to bring the spigot end of the pipe to the first concave roller 4 which is directly under the free end of the beam, the latter being raised slightly by means of jack 32 to permit the beam to enter the end of the pipe, and then lowered to allow the follower roller 16 to contact the bottom of the interior of the pipe. Final alignment of the pipe 8 with the beam 12 is secured by bringing the vertical rollers 61 lightly into contact with the sides of the pipe. The pipe support rollers 42 are now retracted to provide room for the carriage to pass between them, and the carriage moving apparatus is again operated to push the pipe along the bed while readings of pipe thickness are continuously taken through the telescope.

If it is desired to obtain measurements along some other longitudinal element of the pipe 8, the beam is raised to remove the follower roller 16 from contact with the pipe, and the auxiliary rollers 75 are raised by their hydraulic apparatus to raise the pipe slightly above the bed 7. The rollers 75 may then be rotated on their axes the desired amount for positioning the pipe in the new position by means of electric motor 81, and lowered to return the pipe to the bed for the additional measurement.

Upon retraction of the carriage 33 the pipe 8 is removed from the bed 7, care being taken again to bring the beveled rollers 42 together after the carriage passes between them and before the spigot end of the pipe is entirely off the bed.

What I desire to claim is:

1. Mechanism for measuring the wall thickness of a tubular body, comprising a subjacent support for said body to position the latter substantially horizontally, a beam supported at one end and having its free end extending over said subjacent support, said beam being adapted to enter said body when said beam and said body are removed relatively longitudinally during measurement of the latter, a follower carried by said beam adjacent the free end thereof and directly over said subjacent support for contacting the bottom of the inner surface of said body, a vertical linear scale carried by said beam adjacent said follower and in fixed relation with respect to said follower, whereby said follower cooperates with said subjacent support to measure the wall thickness of said body inserted therebetween, and means for reading said scale.

2. Mechanism for measuring the wall thickness of a tubular body, comprising a plurality of rollers for supporting said body substantially horizontally from below for relative longitudinal movement thereon in a direction perpendicular to the axes of said rollers, a beam supported at one end and extending over said rollers, said beam being adapted to enter said body during relative longitudinal movement therebetween, a follower roller carried by said beam adjacent the free end thereof for rolling contact with the bottom of the inner surface of said body, a vertical linear scale carried by said beam adjacent said follower roller and in fixed relation with respect to the axis of said follower roller, and an optical sighting device for reading said scale, said follower roller being positioned vertically above one of said first mentioned rollers and adapted to cooperate therewith to measure the wall thickness of said tubular body inserted therebetween.

3. Mechanism according to claim 2 wherein the contact surfaces of said first mentioned rollers are concave, the radius defining said concavity being at least as great as the outside radius of said tubular body, and wherein the said follower roller is adapted to rest on said one of said first mentioned rollers except when a portion of the tubular body to be measured is inserted therebetween during measurement of said body.

4. Mechanism for measuring the wall thickness of a tubular body, comprising a pluraltiy of rollers for supporting said body substantially horizontally from below for relative longitudinal movement thereon in a direction perpendicular to the axes of said rollers, a beam supported at one end and extending over said rollers so that said beam may enter said body during relative longitudinal movement therebetween, a follower roller carried by said beam adjacent the free end thereof for rolling contact with the bottom of the inner surface of said body, a vertical linear scale carried by said beam adjacent said follower roller, an optical sighting device positioned adjacent the fixed end of said beam for reading said scale, means for moving the free end of said beam vertically a limited distance to separate said follower roller from the inner surface of said body, and auxiliary means for supporting said body for rotation about its longitudinal axis, said auxiliary means being movable vertically through a limited distance above and below said supporting rollers whereby said body may be raised out of contact with said supporting rollers.

5. Mechanism for measuring the wall thickness of a tubular body, comprising a plurality of rollers for supporting said body substantially horizontally from below for relative longitudinal movement thereon in a direction perpendicular to the axes of said rollers, a beam supported at one end and extending over said rollers so that said beam may enter said body during relative longitudinal movement therebetween, a follower roller carried by said beam adjacent the free end thereof for rolling contact with the bottom of the inner surface of said body, a vertical linear scale carried by said beam adjacent said follower roller, a telescope positioned adjacent the fixed end of said beam for reading said scale, means for illuminating said scale, jack means for raising the free end of said beam above the horizontal plane established by said supporting rollers, whereby said follower roller may be separated from the inner surface of said body, a plurality of auxiliary rollers for supporting said body for rotation about its longitudinal axis, said auxiliary rollers being movable vertically a limited distance above and below said plane whereby said body may be raised out of contact with said first mentioned supporting rollers, and means for rotating said body about its longitudinal axis whereby any desired longitudinal element thereof may be placed for measurement between said follower roller and said first mentioned supporting rollers.

6. Mechanism for measuring the wall thickness of a tubular body, comprising a plurality of rollers for supporting said body substantially horizontally from below for relative movement thereon in a direction perpendicular to the axes of said rollers, a beam supported at one end and extending over said rollers, means for aligning said beam substantially with the bore of said tubular body, whereby said beam may enter said body during relative longitudinal movement therebetween, means for moving said body longitudinally with respect to said beam, a follower roller carried by said beam adjacent the free end thereof for rolling contact with the bottom of the inner surface of said body, said follower roller being positioned vertically above one of said first mentioned rollers and adapted to cooperate therewith to measure the wall thickness of said tubular body inserted therebetween, a vertical linear scale carried by said beam adjacent said follower roller and in fixed relation with respect to the axis of said follower roller, and an optical sighting device for reading said scale.

7. Mechanism for measuring the wall thickness of a tubular body, comprising a plurality of rollers for supporting said body substantially horizontally from below for relative longitudinal movement thereon in a direction perpendicular to the axes of said rollers, a beam supported at one end and extending over said rollers so that said beam may enter said body during relative longitudinal movement therebetween, a follower roller carried by said beam adjacent the free end thereof for rolling contact with the bottom of the inner surface of said body, a vertical linear scale carried by said beam adjacent said follower roller, a telescope positioned adjacent the fixed end of said beam for reading said scale, means for illuminating said scale, jack means for raising the free end of said beam above the horizontal plane established by said supporting rollers, whereby said follower roller may be separated from the inner surface of said body, a plurality of auxiliary rollers for supporting said body for rotation about its longitudinal axis, said auxiliary rollers being movable vertically a limited distance above and below said plane whereby said body may be raised out of contact with said first mentioned supporting rollers, and electrically operated means for rotating at least one of said auxiliary rollers whereby a tubular body supported thereby is rotated about its longitudinal axis.

8. Mechanism for measuring the wall thickness of a tubular body comprising a plurality of concave rollers forming a bed to support said body substantially horizontally for relative longitudinal movement thereon in a direction perpendicular to the axes of said rollers, a beam supported at one end and extending over said bed, said beam being adapted to be enveloped by said body when the latter is moved on said bed toward said beam support, a follower roller carried by said beam adjacent the free end thereof for rolling contact with the bottom of the inner surface of said body, a vertical linear scale carried by said beam adjacent said follower roller, an optical sighting device for reading said scale, means for raising the free end of said beam a limited distance above said bed, means for raising said tubular body a limited distance above said bed, means for rotating said tubular body about its longitudinal axis, means for aligning said body on the bed with said beam, and means for moving said body longitudinally with respect to said beam.

9. Mechanism for measuring the wall thickness of a tubular body comprising a plurality of concave rollers forming a bed to support said body substantially horizontally for relative longitudinal movement thereon in a direction perpendicular to the axes of said rollers, a beam supported at one end and extending over said bed, said beam being adapted to be enveloped by said body when the latter is moved on said bed toward said beam support, a follower roller carried by said beam adjacent the free end thereof for rolling contact with the bottom of the inner surface of said body, a vertical linear scale carried by said beam adjacent said follower roller, an optical sighting device for reading said scale, jack means adjacent the fixed end of said beam for raising the free end thereof a limited distance above said bed, a frame extending transversely of said bed, a pair of auxiliary rollers carried by said frame, said auxiliary rolllers being adjacent each other and the axes thereof being disposed on either side of said bed and perpendicular to the axes of said first mentioned rollers, said auxiliary rollers being disposed normally below said bed but movable vertically a limited distance to raise said body above said bed, fluid operated means for moving said auxiliary rollers vertically, means including an electric motor for rotating at least one of said auxiliary rollers on its axis, means for aligning said body on the bed with said beam, and means for moving said body longitudinally with respect to said beam.

10. Mechanism for measuring the wall thickness of a tubular body comprising a plurality of concave rollers forming a bed to support said body substantially horizontally for relative longitudinal movement thereon in a direction perpendicular to the axes of said rollers, a beam supported at one end and extending over said bed, said beam being adapted to be enveloped by said body when the latter is moved on said bed toward said beam support, a follower roller carried by said beam adjacent the free end thereof for rolling contact with the bottom of the inner surface of said body, a vertical linear scale carried by said beam adjacent said follower roller, on optical sighting device for reading said scale, jack means adjacent the fixed end of said beam for raising the free end thereof a limited distance above said bed, a frame extending transversely of said bed, a pair of auxiliary rollers carried by said frame, said auxiliary rollers being adjacent each other and the axes thereof being disposed on either side of the center-line of said bed and perpendicular to the axes of said first mentioned rollers, said auxiliary rollers being disposed normally below said bed but movable vertically a limited distance to raise said body above said bed, fluid operated means for moving said auxiliary rollers vertically, means including an electric motor for rotating at least one of said auxiliary rollers on its axis, a second frame extending transversely of said bed adjacent the end thereof remote from the fixed end of said beam, a guide rod carried by said second frame and extending transversely of said bed, a pair of vertical rollers carried by brackets slidable on said guide rod equidistantly from the center-line of said bed, means for varying the distance between said vertical rollers whereby a tubular body to be measured may be accurately aligned with said beam, and means for moving said body longitudinally with respect to said beam.

References Cited in the file of this patent

UNITED STATES PATENTS

| Number | Name | Date |
|---|---|---|
| 713,784 | Mellor | Nov. 18, 1902 |
| 1,356,214 | Metzger | Oct. 19, 1920 |
| 1,891,195 | Titus | Dec. 13, 1932 |
| 2,123,355 | Feehrer et al. | July 12, 1938 |
| 2,353,184 | Nordquist | July 11, 1944 |
| 2,511,276 | Ljungstrom et al. | June 13, 1950 |
| 2,553,086 | Haidegger | May 15, 1951 |
| 2,563,254 | Lewis | Aug. 7, 1951 |

FOREIGN PATENTS

| Number | Country | Date |
|---|---|---|
| 5,079 of 1880 | Great Britain | Dec. 6, 1880 |
| 608,505 | Germany | Jan. 24, 1935 |
| 334,222 | Italy | Jan. 23, 1936 |
| 204,926 | Switzerland | Aug. 16, 1939 |
| 686,385 | Germany | Jan. 8, 1940 |
| 727,262 | Germany | Oct. 30, 1942 |